(12) United States Patent
Liu et al.

(10) Patent No.: US 6,862,072 B2
(45) Date of Patent: Mar. 1, 2005

(54) LIQUID CRYSTAL DISPLAY AND METHOD FOR MANUFACTURING THE SAME

(75) Inventors: Hsiang Lung Liu, Tao-Yuan (TW); Hsu Ho Wu, Hin-Zhu (TW); Tai Kang Wu, Hin-Zhu (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 10/317,862

(22) Filed: Dec. 11, 2002

(65) Prior Publication Data

US 2004/0032558 A1 Feb. 19, 2004

(30) Foreign Application Priority Data

Aug. 14, 2002 (TW) ...................................... 91212453 U

(51) Int. Cl.[7] ........................................... G02F 1/1339
(52) U.S. Cl. ...................... 349/154; 349/153; 349/190
(58) Field of Search ................................ 349/153, 154, 349/190

(56) References Cited

U.S. PATENT DOCUMENTS

| | | | |
|---|---|---|---|
| 5,263,888 A | | 11/1993 | Ishihara et al. |
| 5,691,793 A | * | 11/1997 | Watanabe et al. ............ 349/155 |
| 5,986,736 A | * | 11/1999 | Kodera et al. ............... 349/134 |
| 6,124,917 A | * | 9/2000 | Fujioka et al. ............... 349/153 |
| 6,157,429 A | * | 12/2000 | Miyawaki et al. ........... 349/138 |
| 6,323,929 B1 | * | 11/2001 | Hirakata ...................... 349/151 |
| 6,740,190 B2 | * | 5/2004 | Takase ......................... 156/267 |

* cited by examiner

Primary Examiner—Huyen Ngo
(74) Attorney, Agent, or Firm—Foley & Lardner LLP

(57) ABSTRACT

An ODF liquid crystal display panel is formed of a pair of mutually spaced-apart substrates. A liquid crystal layer is contained between the substrates. A first sealing member joins the substrates and defines an enclosed non-peripheral region in which the liquid crystal is contained. A second sealing member also joins the substrates. The second sealing member has a plurality of breaks, and is positioned inside the non-peripheral region defined by the first sealing member and divides the non-peripheral region into a display region and a buffer region in fluid communication with the display region. The gap between the substrates in the buffer region is larger than the gap between the substrates in the display region. The panel is formed by forming drops of liquid crystal in the display region and then joining the substrates using the sealing members. Excess liquid crystal flows through the breaks of the second sealing member into the buffer region. Any vacuum bubbles are formed in the buffer region and not in the display region. A black matrix area is preferably provided in a peripheral area of one of the substrates and the buffer region is preferably positioned in the black matrix area.

28 Claims, 8 Drawing Sheets

LIQUID CRYSTAL DISPLAY AND METHOD FOR MANUFACTURING THE SAME

BACKGROUND OF THE INVENTION

1. Field of the Invention

The present invention relates to a structure of a liquid crystal display (LCD) panel and a method for its manufacture. In particular, the invention relates to a structure of an ODF (One-Drop-Fill) LCD panel and a method for its manufacture.

2. Related Technology

In the conventional method for manufacturing a liquid crystal display panel, an empty cavity comprised of two opposed and mutually aligned substrates attached by a sealing member is formed. The cavity is then filled with liquid crystal through a vacuum insertion method. However, the conventional method has various disadvantages, especially in the case of a large-size liquid crystal display panel. In particular, the conventional method is time consuming and requires a large amount of liquid crystal material to completely fill the cavity. For these reasons, a faster fill technique known as a "one-drop fill" (ODF) technique has been developed to reduce the time and cost of manufacturing. A version of the ODF method is disclosed in U.S. Pat. No. 5,263,888, issued to Teruhisa Ishihara et al. on Nov. 23, 1993, the entirety of which is incorporated herein by reference for its teachings regarding the ODF method. The basic concepts of the ODF method are illustrated in FIGS. 1a and 1b. FIG. 1a is a view showing an array substrate 9 of a conventional ODF-LCD panel, and FIG. 1b is a perspective view showing a pair of substrates of a conventional ODF-LCD panel comprising the array substrate 9 and a color filter substrate 1. The array substrate 9 has a sealing member 7 formed at a peripheral region surrounding a display region in which drops 8 of liquid crystal are provided. The drops may include a small amount of solid spherical spacers, e.g. 0.3 wt %. The color filter substrate 1 has a color pixel area 3 at its center and a black matrix area 5 at its periphery. The array substrate 9 and the color filter substrate 1 are held spaced apart and placed in a vacuum chamber of a vacuum assembly apparatus. While still under atmospheric pressure, the color filter substrate 1 is positioned precisely above the array substrate 9. Air pressure in the vacuum chamber is then reduced, and the two substrates are brought together so that the color filter substrate 1 becomes superposed on the array substrate 9. The sealing member 7 is then hardened, e.g. by application of ultraviolet radiation.

The main challenge of the conventional ODF method is controlling the total volume of the liquid crystal drops. If the total volume of the liquid crystal drops is insufficient to fill the LCD panel, bubbles of empty space ("vacuum bubbles") are formed within the panel. This problem can be overcome by providing a greater volume of liquid crystal drops on the substrate. However, if the total volume of liquid crystal is excessive or insufficient, as a result of either overfilling or underfilling, the gap between the two substrates will not be uniform and the device will not accurately reproduce images. Environmental factors such as temperature changes or dropping of the device may also produce these problems.

An improved version of the ODF method that is intended to overcome these problems is described in issued Taiwanese patent No. 482,913. In this method, a frame-shaped bulge is formed on a substrate between a sealing member and a display region. The liquid crystal is dropped inside the display region surrounded by the frame-shaped bulge on the substrate, wherein the volume of liquid crystal is greater than the volume of the display region surrounded by the frame-shaped bulge and less than the volume of a region surrounded by the sealing member. The substrate is then superposed to another substrate, and excess liquid crystal flows through a break into a buffer region formed between the sealing member and the frame-shaped bulge. While this method can overcome the problems of insufficient liquid crystal, the method has other disadvantages. One disadvantage is that it is difficult for the liquid crystal to flow through the break into the buffer region. Another difficulty is that bubbles are still caused by insufficient liquid crystal in the buffer region, and those bubbles enter the display region while the LCD panel is shaken.

SUMMARY OF THE INVENTION

In view of the foregoing problems, it is an object of the present invention to provide a method for manufacturing a liquid crystal display panel that reduces the formation of vacuum bubbles and that does reduces panel thickness non-uniformities in the display area.

To achieve the above objectives, the invention provides a liquid crystal display panel structure in which a sealing member defines an enclosed region comprising a display region and a buffer region. Breaks in the sealing member allow the flow of liquid crystal from the display region into the buffer region. Sealant heights are chosen such that the gap between the substrates is greater in the buffer region than in the display region. The LCD panel is formed by an ODF method in which the display region is filled with drops of liquid crystal that have a total volume that is greater than the volume of the display region. When the panel substrates are superposed, excess liquid crystal flows through the breaks into the buffer region. This causes any vacuum bubbles to be formed in the buffer region and not in the display region. The buffer region is preferably aligned with a black matrix area of a substrate to minimize light leakage.

In accordance with one embodiment of the invention, a liquid crystal display panel comprises a pair of mutually spaced-apart substrates. A liquid crystal layer is contained between the substrates. A sealing member joins the substrates and defines an enclosed non-peripheral region in which the liquid crystal is contained. The sealing member divides the non-peripheral region into a display region and a buffer region that is in fluid communication with the display region through breaks in the sealing member. The sealing member may be formed as a first sealing member that defines an enclosed non-peripheral region and a second sealing member that divides the non-peripheral region into the display region and the buffer region. A gap between the substrates in the buffer region is larger than a gap between the substrates in the display region.

In accordance with another embodiment of the invention, a liquid crystal display panel is manufactured. A pair of mutually spaced-apart substrates is provided. A sealing member is formed on a surface of one of the substrates and defines a non-peripheral region of the substrate. The sealing member further divides the non-peripheral region into a display region and a buffer region that is in fluid communication with the display region through breaks in the sealing member. The sealing member may be formed as a first sealing member that defines the enclosed non-peripheral region and a second sealing member that divides the non-peripheral region into the display region and the buffer region in fluid communication with the display region. A plurality of liquid crystal drops are then formed on the same surface of the same substrate in the display region. A total volume of the liquid crystal drops is greater than the volume of the display region. The pair of substrates is then superposed under reduced ambient air pressure such that the substrates are joined by the sealing member. A gap between the substrates in the buffer region is larger than a gap between the substrates in the display region.

In accordance with another embodiment of the invention, a one drop fill (ODF) liquid crystal display panel comprises a pair of mutually spaced-apart substrates. A black matrix area is provided at a peripheral region of one of the substrates. A liquid crystal layer is contained between the substrates. A sealing member joins the substrates. The sealing member defines an enclosed non-peripheral region in which the liquid crystal is contained, and divides the non-peripheral region into a display region and a buffer region in fluid communication with the display region. The sealing member may be formed as a first sealing member that defines an enclosed non-peripheral region and a second sealing member that divides the non-peripheral region into the display region and the buffer region. The buffer region is located inside the black matrix area. A gap between the substrates in the buffer region is larger than a gap between the substrates in the display region. The volume of the liquid crystal between the substrates is greater than the volume of the display region, and an excess amount of the liquid crystal flows into the buffer region.

The material of the sealing member preferably comprises glass fibers supported in a photo-curing type material.

In one preferred embodiment, the second sealing member is parallel to one side of the first sealing member.

In another preferred embodiment, the second sealing member is parallel to two sides of the first sealing member.

In another preferred embodiment, the second sealing member is parallel to three sides of the first sealing member.

In another preferred embodiment, the second sealing member is rectangular and encompasses the display region.

The liquid crystal material may include spacers, for example, small hard spherical spacers.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 3 is a sectional view showing the ODF-LCD panel of FIG. 2a; and

DESCRIPTION OF PREFERRED EMBODIMENTS

First Embodiment

Figure 1A:
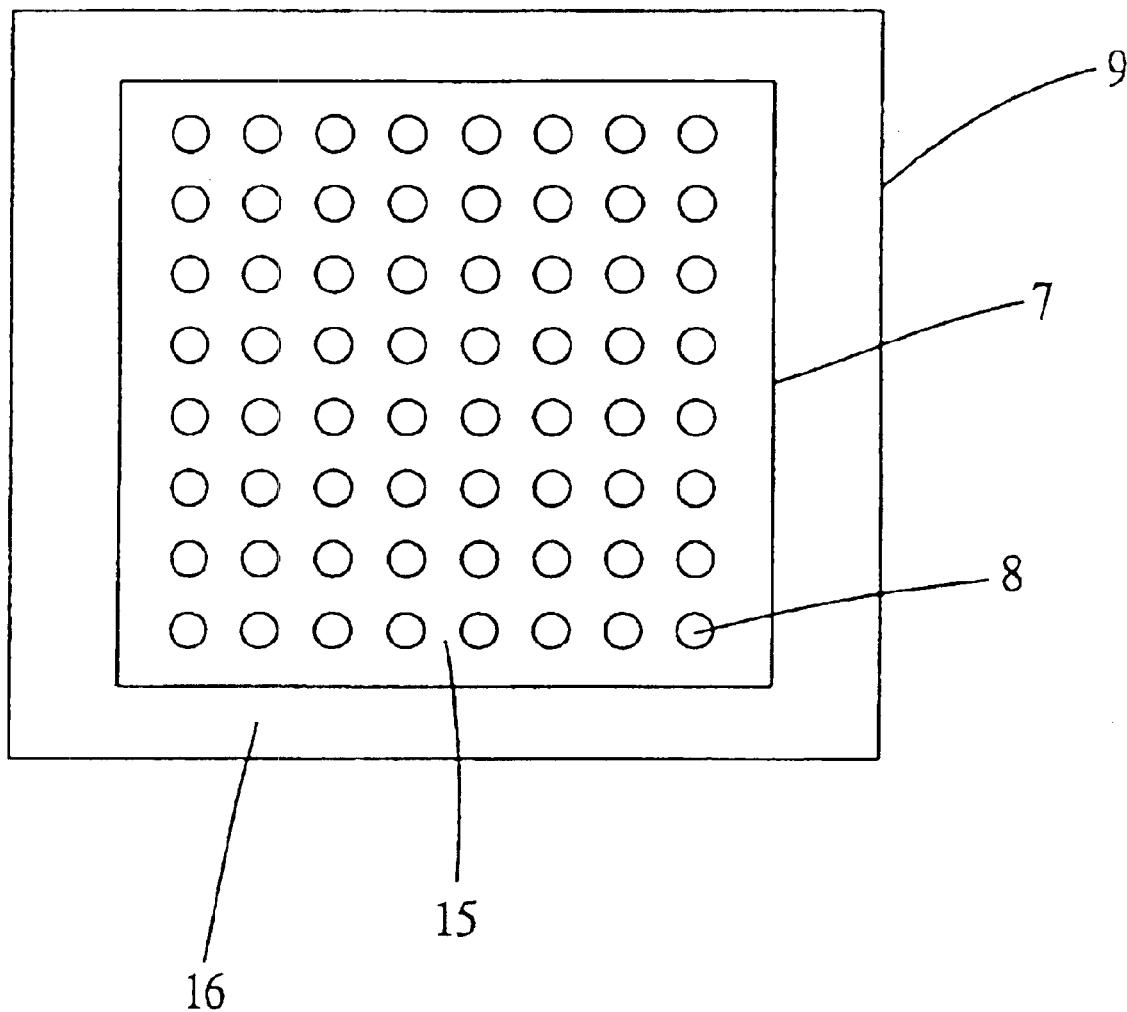
FIG. 1a is a plan view showing a substrate of a conventional ODF-LCD panel.
Figure 1B:
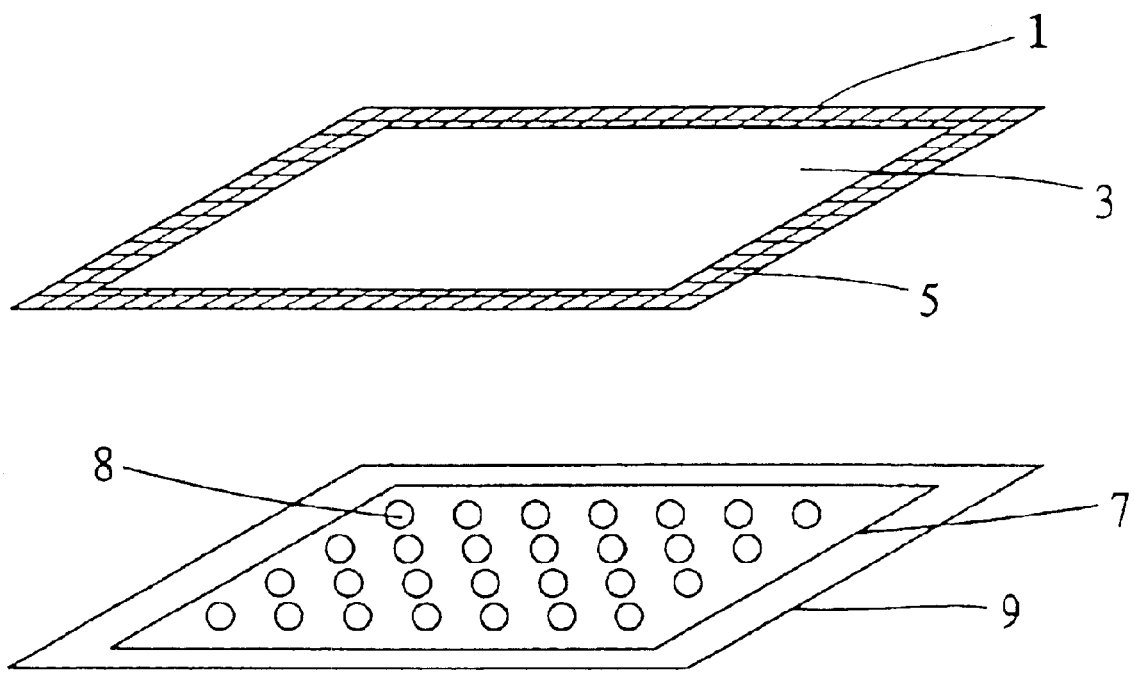
FIG. 1b is a perspective view showing a pair of substrates of a conventional ODF-LCD panel.
Figure 2A:
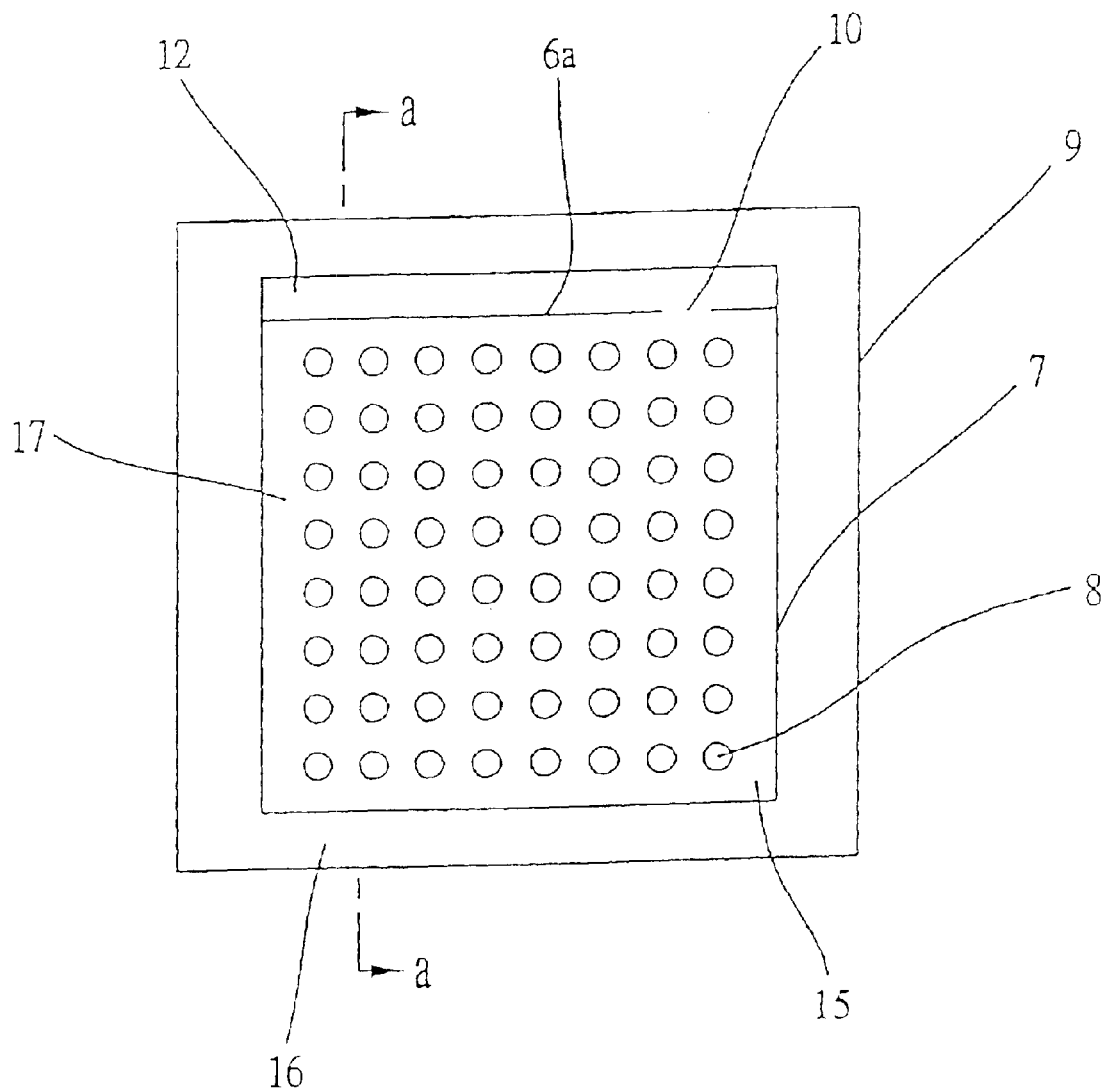
FIG. 2a is a plan view showing an ODF-LCD panel of the first embodiment of the present invention.
Figure 3:
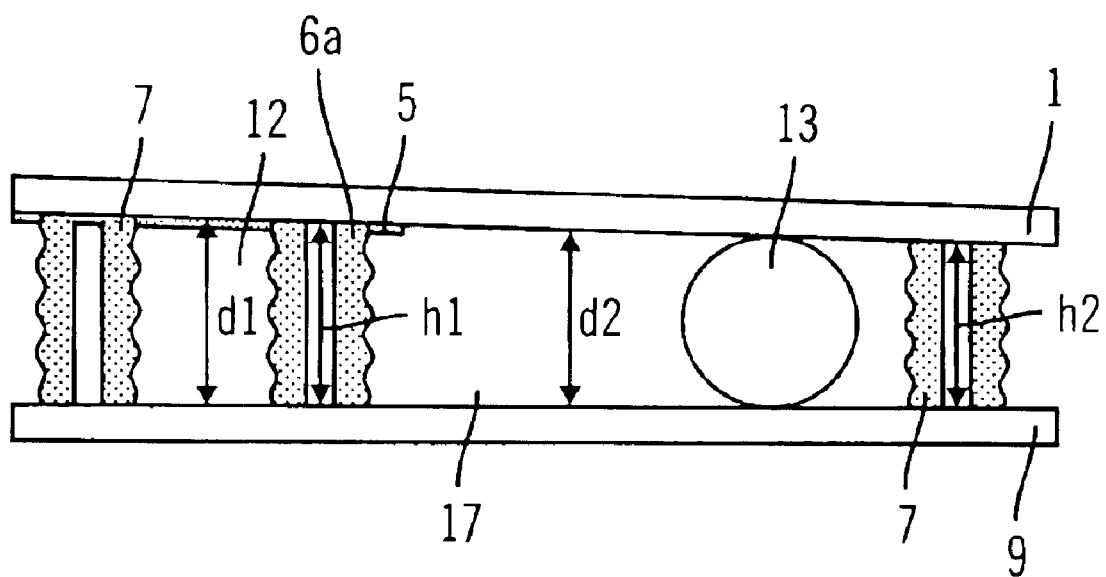

FIG. 2a shows an ODF-LCD panel that may be used in conjunction with the color filter substrate of FIG. 1a in accordance with a first embodiment of the present invention. Initially an outer sealing member 7 is formed on the surface of an array substrate 9. The outer sealing member 7 demarcates a peripheral region 16 and a non-peripheral region 15 of the array substrate 9. An inner sealing member 6a having a plurality of breaks 10 is formed parallel to one side of the outer sealing member 7 and is positioned inside the non-peripheral region 15 at a location corresponding to the black matrix area 5 of an opposing color filter substrate. The outer sealing member and the inner sealing member are preferably formed of glass fibers supported in a photo-curing material, and may be formed concurrently as a single member or separately. The inner sealing member 6a divides the non-peripheral region 15 into a display region 17 and a buffer region 12 that extends along one side of the display region 17. A plurality of liquid crystal drops 8 are then formed on the display region 17, with the total volume of the liquid crystal drops 8 being greater than the volume of the display region 17. The color filter substrate 1 and the array substrate 9 are then superposed face-to-face as shown in FIG. 1b under reduced ambient air pressure. Any excess liquid crystal flows through the plurality of breaks 10 into the buffer region 12, causing any vacuum bubbles to form in the buffer region 12. Consequently, vacuum bubbles resulting from insufficient liquid crystal, and non-uniform display area thickness resulting from insufficient or excess liquid crystal, are reduced in the display region 17. Furthermore, light leakage is reduced by positioning the buffer region 12 and the inner sealing member 6a in opposition to the black matrix area 5. In a preferred embodiment of the present invention, the heights of the outer sealing member 7 and the inner sealing member 6a are different, as shown in the sectional view of FIG. 3. In particular, the height h1 of the inner sealing member 6a is greater than the height h2 of the outer sealing member 7. As a result, the gap d1 between the pair of substrates of the buffer region 12 is greater than the gap d2 between the pair of substrates of the display region 17. This constrains the vacuum bubbles to the buffer region 12 since the vacuum bubbles tend to flow to areas having a greater thickness. Spacers 13 may be provided in the liquid crystal material.

Second Embodiment

Figure 2B:
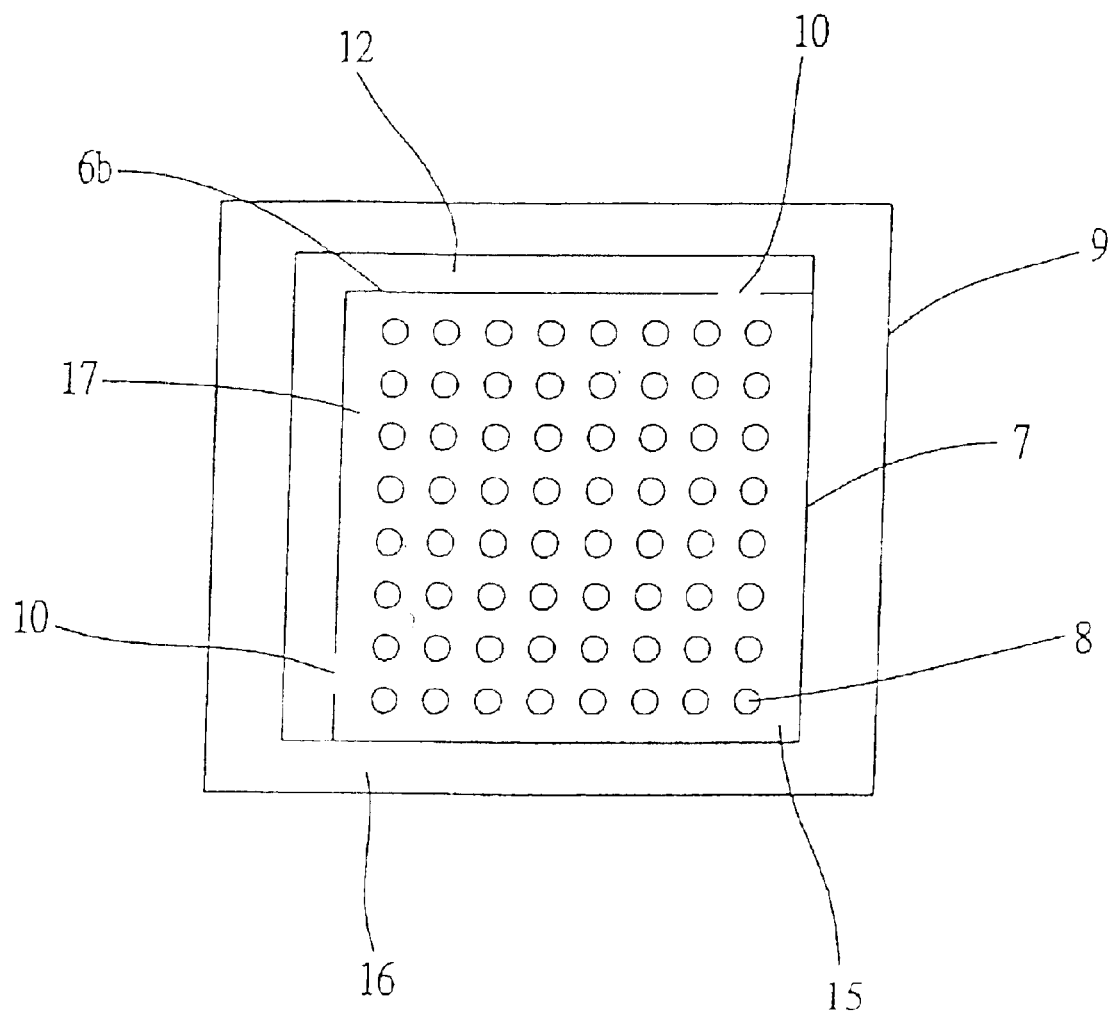
FIG. 2b is a plan view showing an ODF-LCD panel of the second embodiment of the present invention.

FIG. 2b shows an ODF-LCD panel of the second embodiment of the present invention. Initially an outer sealing member 7 is formed on the surface of an array substrate 9. The outer sealing member 7 demarcates a peripheral region 16 and a non-peripheral region 15 of the array substrate 9. An inner sealing member 6b having a plurality of breaks 10 is formed parallel to two sides of the outer sealing member 7 and is positioned inside the non-peripheral region 15 at a location corresponding to the black matrix area 5 of an opposing color filter substrate. The outer sealing member and the inner sealing member are preferably formed of glass fibers supported in a photo-curing material, and may be formed concurrently as a single member or separately. The inner sealing member 6b divides the non-peripheral region 15 into a display region 17 and a buffer region 12 that extends around two sides of the display region 17. A plurality of liquid crystal drops 8 are then formed on the display region 17, with the total volume of the liquid crystal drops 8 being greater than the volume of the display region 17. The color filter substrate 1 and the array substrate 9 are superposed face-to-face as shown in FIG. 1b under reduced ambient air pressure. Any excess liquid crystal flows through the plurality of breaks 10 into the buffer region 12, causing any vacuum bubbles to form in the buffer region 12.

Consequently, vacuum bubbles resulting from insufficient liquid crystal, and non-uniform display area thickness resulting from insufficient or excess liquid crystal, are reduced in the display region 17. Furthermore, light leakage is reduced by positioning the buffer region 12 and the inner sealing member 6b in opposition to the black matrix area 5. In a preferred embodiment of the present invention, the heights of the outer sealing member 7 and the inner sealing member 6b are different, as shown in the sectional view of FIG. 3. In particular, the height h1 of the inner sealing member 6b is greater than the height h2 of the outer sealing member 7. As a result, the gap d1 between the pair of substrates of the buffer region 12 is greater than the gap d2 between the pair of substrates of the display region 17. This constrains the vacuum bubbles to the buffer region 12 since the vacuum bubbles tend to flow to areas having a greater thickness. Spacers 13 may be provided in the liquid crystal material.

Third Embodiment

Figure 2C:
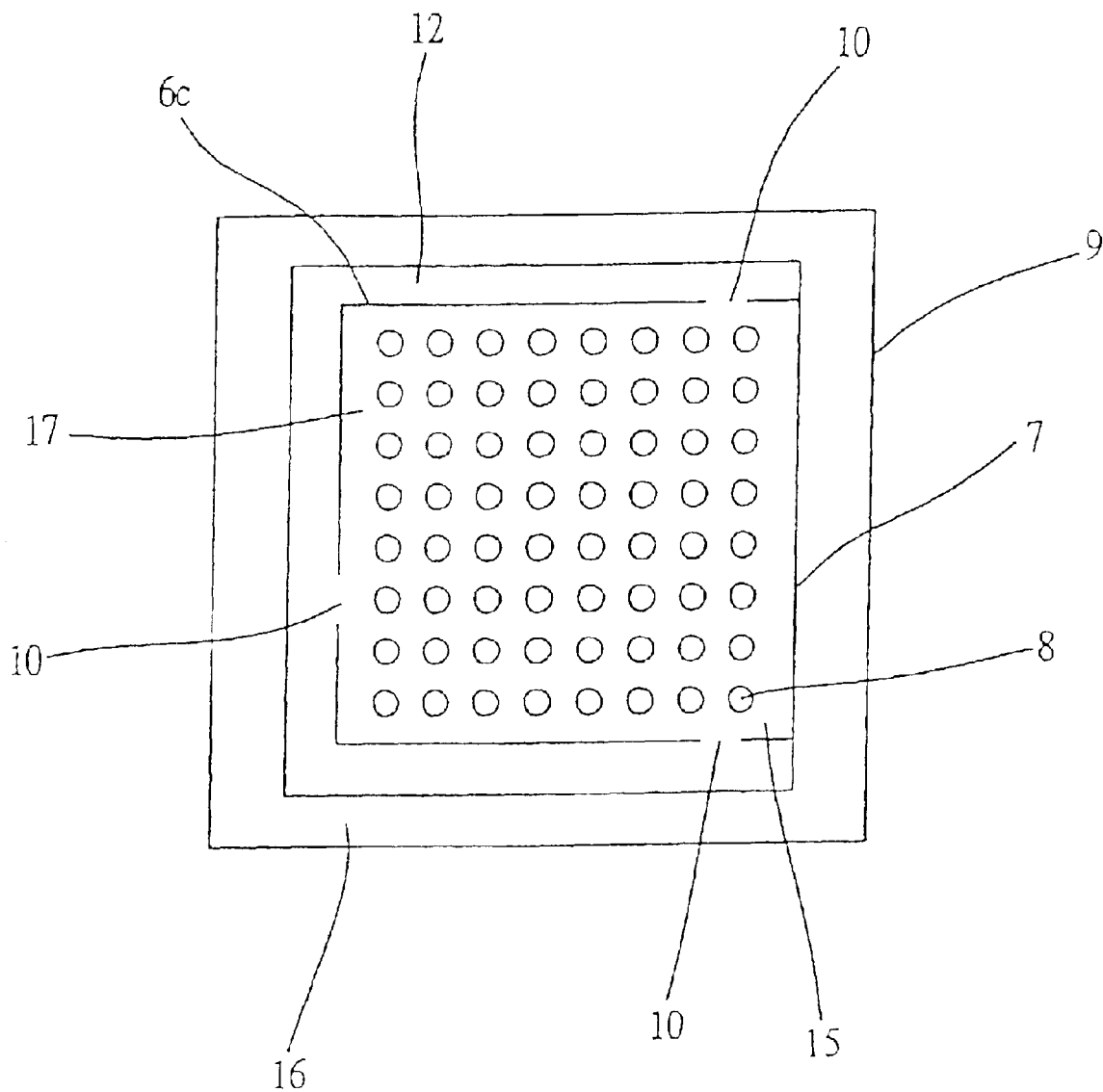
FIG. 2c is a plan view showing an ODF-LCD panel of the third embodiment of the present invention.

FIG. 2c shows an ODF-LCD panel of the second embodiment of the present invention. Initially an outer sealing member 7 is formed on the surface of an array substrate 9. The outer sealing member 7 demarcates a peripheral region 16 and a non-peripheral region 15 of the array substrate 9. An inner sealing member 6c having a plurality of breaks 10 is formed parallel to three sides of the outer sealing member 7 and is positioned inside the non-peripheral region 15 at a location corresponding to the black matrix area 5 of an opposing color filter substrate. The outer sealing member and the inner sealing member are preferably formed of glass fibers supported in a photo-curing material, and may be formed concurrently as a single member or separately. The inner sealing member 6c divides the non-peripheral region 15 into a display region 17 and a buffer region 12 that extends around three sides of the display region 17. A plurality of liquid crystal drops 8 are then formed on the display region 17, with the total volume of the liquid crystal drops 8 being greater than the volume of the display region 17. The color filter substrate 1 and the array substrate 9 are superposed face-to-face as show in FIG. 1b under reduced ambient air pressure. Any excess liquid crystal flows through the plurality of breaks 10 into the buffer region 12, causing any vacuum bubbles to form in the buffer region 12. Consequently, vacuum bubbles resulting from insufficient liquid crystal, and non-uniform display area thickness resulting from insufficient or excess liquid crystal, are reduced in the display region 17. Furthermore, light leakage is reduced by positioning the buffer region 12 and the inner sealing member 6c in opposition to the black matrix area 5. In a preferred embodiment of the present invention, the heights of the outer sealing member 7 and the inner sealing member 6c are different, as shown in the sectional view of FIG. 3. In particular, the height h1 of the inner sealing member 6c is greater than the height h2 of the outer sealing member 7. As a result, the gap d1 between the pair of substrates of the buffer region 12 is higher than the gap d2 between the pair of substrates of the display region 17. This constrains the vacuum bubbles to the buffer region 12 since the vacuum bubbles tend to flow to areas having a greater thickness. Spacers 13 may be provided in the liquid crystal material.

Fourth Embodiment

Figure 2D:
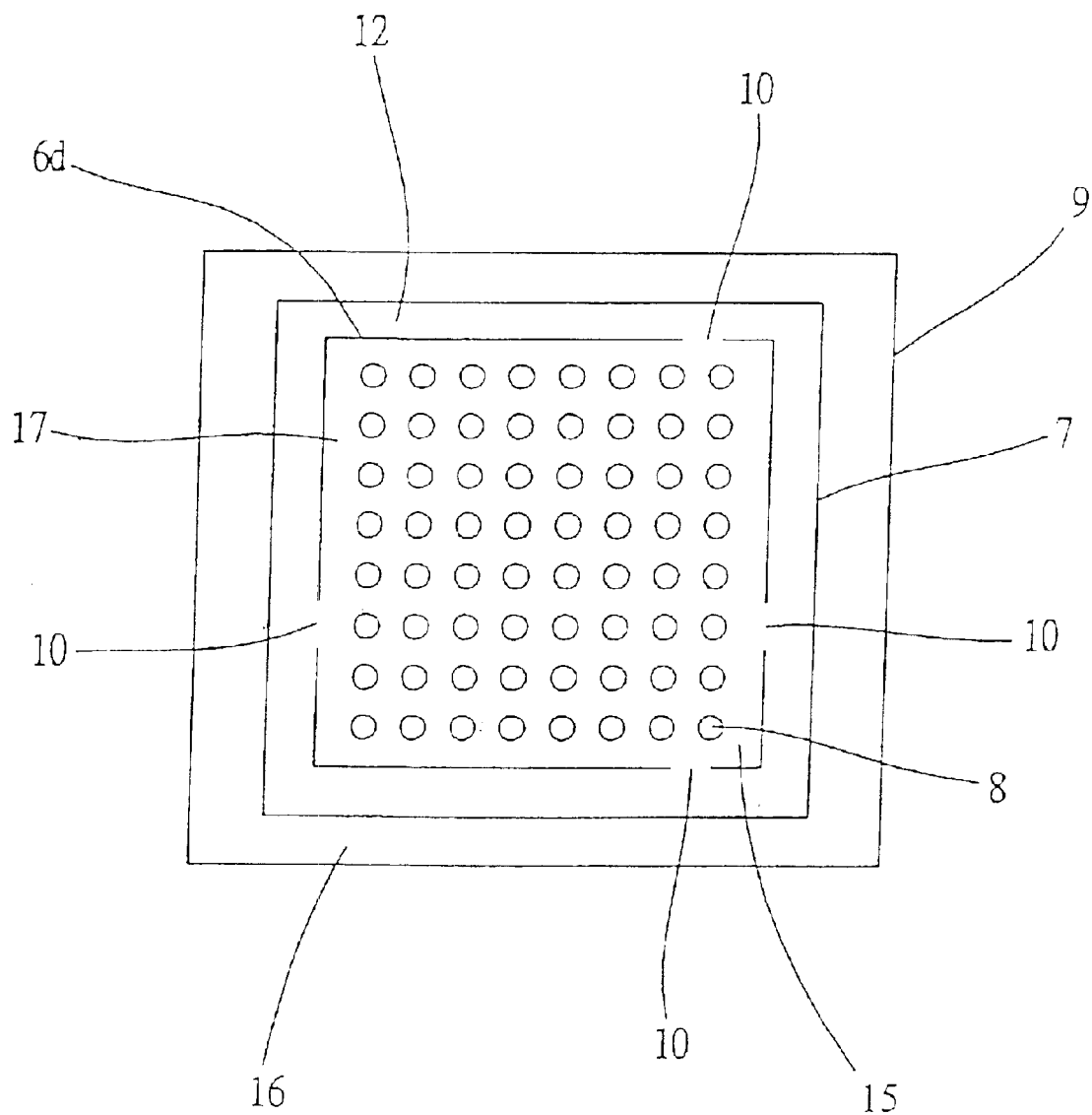
FIG. 2d is a plan view showing an ODF-LCD panel of the fourth embodiment of the present invention.

FIG. 2d shows an ODF-LCD panel of the second embodiment of the present invention. Initially an outer sealing member 7 is formed on the surface of an array substrate 9. The outer sealing member 7 demarcates a peripheral region 16 and a non-peripheral region 15 of the array substrate 9. An inner sealing member 6d having a plurality of breaks 10 is formed parallel to four sides of the outer sealing member 7 and is positioned inside the non-peripheral region 15 at a location corresponding to the black matrix area 5 of an opposing color filter substrate. The outer sealing member and the inner sealing member are preferably formed of glass fibers supported in a photo-curing material, and may be formed concurrently as a single member or separately. The inner sealing member 6d encompasses a rectangular display region 17 and thereby defines a buffer region 12 that extends around four sides of the display region 17. A plurality of liquid crystal drops 8 are then formed on the display region 17, with the total volume of the liquid crystal drops 8 being greater than the volume of the display region 17. The color filter substrate 1 and the array substrate 9 are superposed face-to-face as shown in FIG. 1b under reduced ambient air pressure. Any excess liquid crystal flows through the plurality of breaks 10 into the buffer region 12, causing any vacuum bubbles to form in the buffer region 12. Consequently, vacuum bubbles resulting from insufficient liquid crystal, and non-uniform display area thickness resulting from insufficient or excess liquid crystal, are reduced in the display region 17. Furthermore, light leakage is reduced by positioning the buffer region 12 and the inner sealing member 6d in opposition to the black matrix area 5. In a preferred embodiment of the present invention, the heights of the outer sealing member 7 and the inner sealing member 6d are different, as shown in the sectional view of FIG. 3. In particular, the height h1 of the inner sealing member 6d is greater than the height h2 of the outer sealing member 7. As a result, the gap d1 between the pair of substrates of the buffer region 12 is higher than the gap d2 between the pair of substrates of the display region 17. This constrains the vacuum bubbles to the buffer region 12 since the vacuum bubbles tend to flow to areas having a greater thickness. Spacers 13 may be provided in the liquid crystal material.

Figure 4:
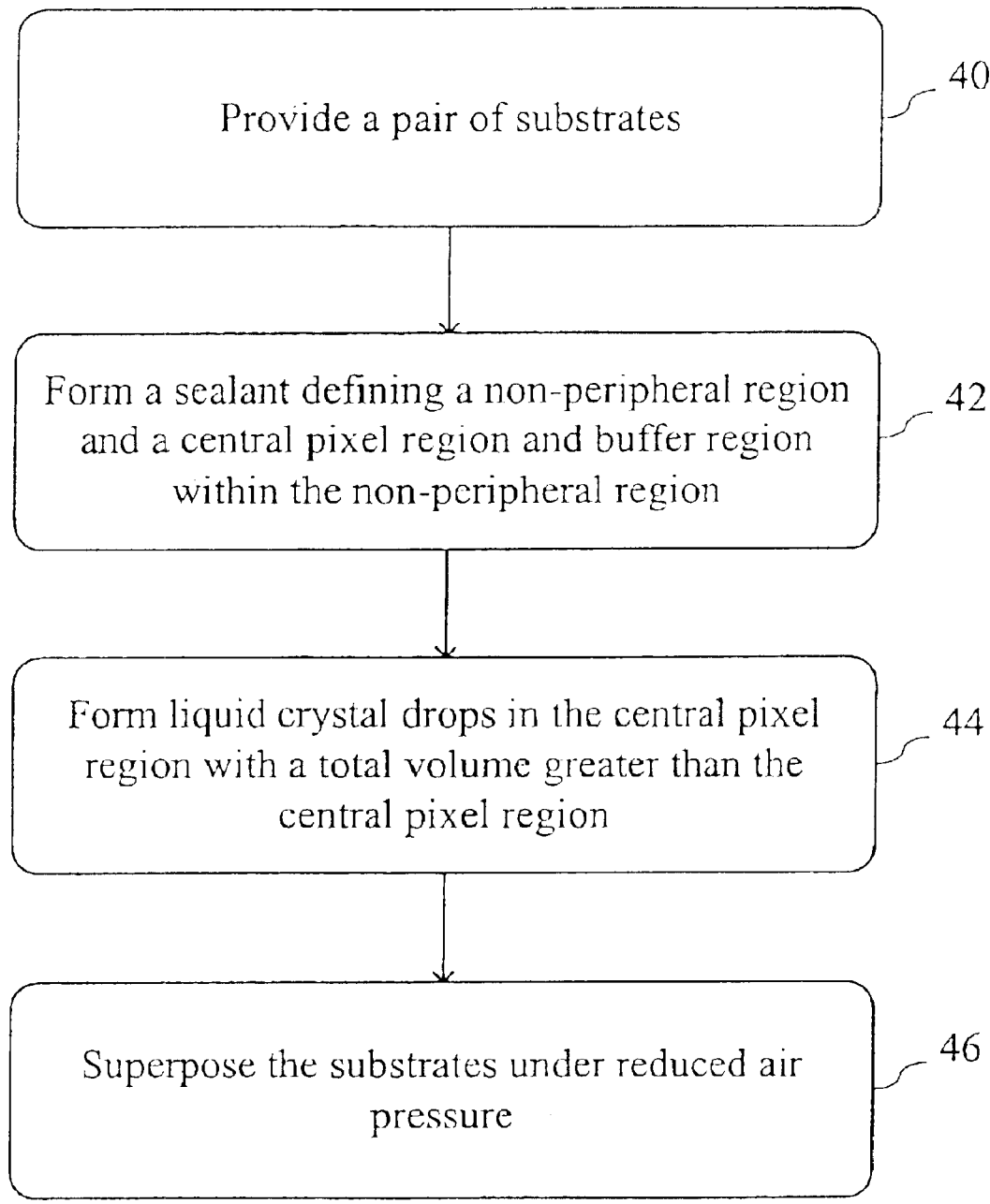
FIG. 4 shows a process flow encompassing the preferred embodiments and alternative embodiments.

A process flow for producing a liquid crystal display panel that encompasses the aforementioned embodiments and alternative embodiments is shown in FIG. 4. Initially a pair of mutually spaced-apart substrates is provided (40). A black matrix area is preferably provided at a peripheral region of one of the substrates. A sealing member is then formed on a surface of one of the substrates (42). The sealing member defines an enclosed non-peripheral region of the substrate. The sealing member further divides the non-peripheral region into a display region and a buffer region that is in fluid communication with the display region. The sealing member may be formed as a first sealing member that defines the enclosed non-peripheral region and a second sealing member that divides the enclosed non-peripheral region into the display region and the buffer region. A plurality of liquid crystal drops are then formed on the same surface of the same substrate in the display region (44). The total volume of the liquid crystal drops is greater than the volume of the display region. The pair of substrates is then superposed under reduced ambient air pressure such that the substrates are joined by the sealing member (46). A gap between the substrates in the buffer region is larger than a gap between the substrates in the display region. When superposed, excess liquid crystal flows through the breaks of the sealing member from the display region into the buffer region. Any vacuum bubbles are formed in the buffer region and are not formed in the display region. The vacuum bubbles tend to stay in the buffer region since the gap between the substrates is greater in the buffer region than in the display region. The buffer region is preferably formed in the black matrix area so that light leakage is reduced. In various embodiments, the buffer region may be provided at one, two, three, or all four sides of a rectangular display region. Other buffer region geometries may also be utilized.

Although the invention has been described in its preferred form with a certain degree of particularity, it should be understood that the presently preferred embodiments may be altered with respect to details of construction as well as combinations and arrangements of parts without departing from the spirit and the scope of the invention as defined by the appended claims and their equivalents.

What is claimed is:

1. A liquid crystal display panel, comprising:
    a pair of mutually spaced-apart substrates;
    a liquid crystal layer contained between the substrates; and
    a sealing member joining the substrates, the sealing member having a first portion defining an enclosed non-peripheral region in which said liquid crystal is contained, and the sealing member having a second portion dividing the non-peripheral region into a display region and a buffer region in fluid communication with the display region,
    wherein a gap between the substrates surrounding the second portion of the sealing member is greater than a gap between the substrates in the remainder of the display region; and
    wherein the second portion of the sealing member has a height that is greater than the first portion of the sealing member.

2. A liquid crystal display panel as claimed in claim 1, wherein the liquid crystal layer is formed from a plurality of liquid crystal drops.

3. A liquid crystal display panel as claimed in claim 2, wherein a volume of liquid crystal drops is greater than a volume of the display region, and excess liquid crystal flows into the buffer region.

4. A liquid crystal display panel as claimed in claim 1, wherein the liquid crystal layer comprises liquid crystal material and spacers.

5. A liquid crystal display panel as claimed in claim 1, wherein vacuum bubbles are formed in the buffer region and are not formed in the display region.

6. A liquid crystal display panel, comprising:
    a pair of mutually spaced-apart substrates;
    a liquid crystal layer contained between the substrates;
    a first sealing member joining the substrates and defining an enclosed non-peripheral region in which said liquid crystal is contained; and
    a second sealing member comprising a plurality of breaks, the second sealing member being formed on one of the substrates and being positioned inside the non-peripheral region defined by the first sealing member and dividing the non-peripheral region into a display region and a buffer region in fluid communication with the display region,
    wherein a gap between the substrates surrounding the second portion of the sealing member is greater than a gap between the substrates in the remainder of the display region.

7. A liquid crystal display panel as claimed in claim 6, wherein a black matrix area is provided at a peripheral region of the other one of the substrates, and wherein the second sealing member and the buffer region are located inside the black matrix area.

8. A liquid crystal display panel as claimed in claim 6, wherein a height of the second sealing member is greater than a height of the first sealing member.

9. A liquid crystal display panel as claimed in claim 6, wherein the first sealing member and the second sealing member are made of glass fibers supported in a photo-curing type material.

10. A liquid crystal display panel as claimed in claim 6, wherein the first sealing member defines a rectangular non-peripheral region and the second sealing member is parallel to one side of the first sealing member.

11. A liquid crystal display panel as claimed in claim 6, wherein the first sealing member defines a rectangular non-peripheral region and the second sealing member is parallel to two sides of the first sealing member.

12. A liquid crystal display panel as claimed in claim 6, wherein the first sealing member defines a rectangular non-peripheral region and the second sealing member is parallel to three sides of the first sealing member.

13. A liquid crystal display panel as claimed in claim 6, wherein the first sealing member defines a rectangular non-peripheral region and the second sealing member encompasses a rectangular display region.

14. A method for manufacturing a liquid crystal display panel, comprising:
    providing a pair of substrates;
    forming a sealing member on a surface of one of the substrates, the sealing member having a first portion defining an enclosed non-peripheral region of the substrate, the sealing member further having a second portion dividing the non-peripheral region into a display region and a buffer region in fluid communication with the display region;
    forming a plurality of liquid crystal drops on the surface of the one of the substrates in the display region, wherein a total volume of said liquid crystal drops is greater than a volume of the display region; and
    superposing the pair of substrates under reduced ambient air pressure such that the substrates are joined by the sealing member, wherein a gap between the substrates surrounding the second portion of the sealing member is greater than a gap between the substrates in the remainder of the display region; and
    wherein the second portion of the sealing member has a height that is greater than the first portion of the sealing member.

15. A method as claimed in claim 14, wherein excess liquid crystal flows through a plurality of breaks in the second portion of the sealing member from the display region into the buffer region when the substrates are superposed.

16. A method as claimed in claim 14, wherein vacuum bubbles are formed in the buffer region and are not formed in the display region.

17. A method as claimed in claim 14, wherein the liquid crystal drops comprises liquid crystal material and spacers.

18. A method for manufacturing a liquid crystal display panel, comprising:
    providing a pair of substrates;
    forming a first sealing member on a surface of the one of substrates, the first sealing member defining an enclosed non-peripheral region of the substrate;
    forming a second sealing member on a surface of one of the substrates within said non-peripheral region, the second sealing member having a plurality of breaks therein, the second sealing member dividing the non-peripheral region into a display region and a buffer region in fluid communication with the display region;

forming a plurality of liquid crystal drops on the surface of the one of the substrates in the display region, wherein a total volume of said liquid crystal drops is greater than a volume of the display region; and superposing the pair of substrates under reduced ambient air pressure such that the substrates are joined by the sealing member, wherein a gap between the substrates surrounding the second sealing member is greater than a gap between the substrates in the remainder of the display region.

19. A method as claimed in claim 18, wherein a black matrix area is provided at a peripheral region of the other one of the substrates, and wherein the second sealing member and the buffer region are located inside the black matrix area.

20. A method as claimed in claim 18, wherein a height of the second sealing member is greater than a height of the first sealing member.

21. A method as claimed in claim 18, wherein the first sealing member and the second sealing member are made of glass fibers supported in a photo-curing type material.

22. A method as claimed in claim 18, wherein the first sealing member defines a rectangular non-peripheral region and the second sealing member is parallel to one side of the first sealing member.

23. A method as claimed in claim 18, wherein the first sealing member defines a rectangular non-peripheral region and the second sealing member is parallel to two sides of the first sealing member.

24. A method as claimed in claim 18, wherein the first sealing member defines a rectangular non-peripheral region and the second sealing member is parallel to three sides of the first sealing member.

25. A method as claimed in claim 18, wherein the first sealing member defines a rectangular non-peripheral region and the second sealing member encompasses a rectangular display region.

26. An one drop fill (ODF) liquid crystal display panel, comprising:

a pair of mutually spaced-apart substrates, a black matrix area being provided at a peripheral region of one of the substrates;

a liquid crystal layer contained between the substrates;

a sealing member joining the substrates, the sealing member having a first portion defining an enclosed non-peripheral region in which said liquid crystal is contained, the sealing member having a second portion dividing the non-peripheral region into a display region and a buffer region in fluid communication with the display region;

wherein the buffer region is located inside the black matrix area, wherein a gap between the substrates surrounding the second portion of the sealing member is greater than a gap between the substrates in the remainder of the display region, and wherein a volume of said liquid crystal is greater than a volume of said display region, an excess amount of said liquid crystal flowing into the buffer region; and wherein the second portion of the sealing member has a height that is greater than the first portion of the sealing member.

27. An ODF liquid crystal display panel as claimed in claim 26, wherein vacuum bubbles are formed in the buffer region and are not formed in the display region.

28. An one drop fill ODF liquid crystal display panel, comprising:

a pair of mutually spaced-apart substrates, a black matrix area being provided at a peripheral region of one of the substrates;

a liquid crystal layer contained between the substrates;

a first sealing member joining the substrates, the first sealing member defining an enclosed non-peripheral region in which said liquid crystal is contained; and a second sealing member joining the substrates, the second sealing member comprising a plurality of breaks, the second sealing member being positioned inside the non-peripheral region defined by the first sealing member and dividing the non-peripheral region into a display region and a buffer region in fluid communication with the display region;

wherein the buffer region is located inside the black matrix area, wherein a gap between the substrates surrounding the second sealing member is greater than a gap between the substrates in the remainder of the display region, and wherein a volume of said liquid crystal is greater than a volume of said display region, an excess amount of said liquid crystal flowing into the buffer region; and wherein a height of the second sealing member is greater than a height of the first sealing member.

* * * * *